April 29, 1930.     R. M. G. PHILLIPS     1,756,303
SLED
Filed April 1, 1927     2 Sheets-Sheet 1

INVENTOR
Ross M. G. Phillips
BY
ATTORNEY

April 29, 1930.  R. M. G. PHILLIPS  1,756,303
SLED
Filed April 1, 1927  2 Sheets-Sheet 2
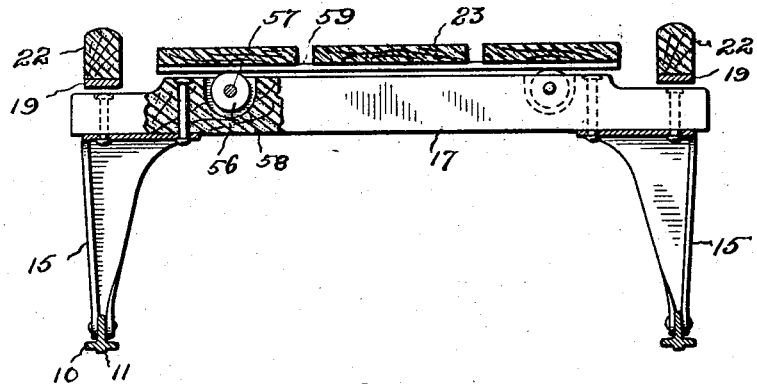
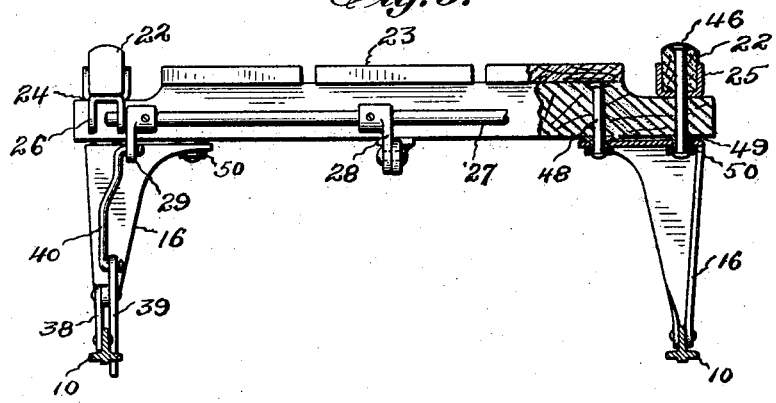
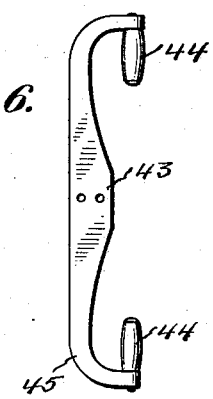
INVENTOR
Ross M. G. Phillips
BY
ATTORNEY Patented Apr. 29, 1930

1,756,303

UNITED STATES PATENT OFFICE

ROSS M. G. PHILLIPS, OF NEW HAVEN, CONNECTICUT

SLED

Application filed April 1, 1927. Serial No. 180,271.

This invention relates to new and useful improvements in sleds.

It is the object of this invention, among other things, to provide a sled wherein the runners will have the maximum flexibility; will be easily guided or steered; and have means for checking or braking its movement; as well as to produce a sled having the maximum strength, capable of withstanding rough and hard usage, constructed with the fewest possible parts and produced at the minimum cost.

To these, and other ends, my invention consists in the sled, having certain details of construction and combinations of parts, as will be hereinafter described and more particularly pointed out in the claims.

Referring to the drawings, in which like numerals of reference indicate like parts in the several figures;

Figure 4 is an enlarged transverse sectional view, the parts in section being taken substantially on the plane indicated by the line 4—4 of Figure 1;

Figure 5 is an enlarged transverse sectional view, the parts in section being taken substantially upon the plane indicated by the line 5—5 of Figure 1;

Figure 6 is a view of a modified form of the steering bar; and

Figure 7 is an enlarged cross sectional view of one of the runners.

Figure 1:
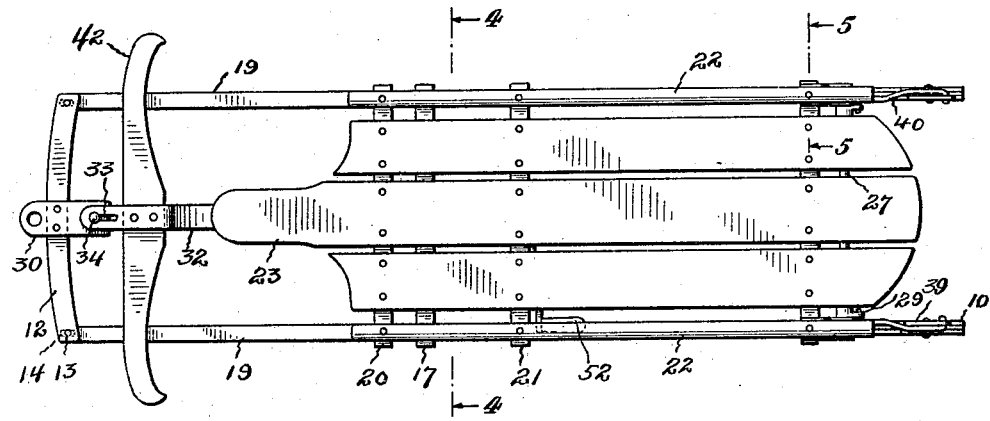
Figure 1 is a plan view of my improved sled.

Having reference to the drawings, the numeral 10 designates the runners constructed substantially of inverted T shape rails, with a contact strip 11 upon the underside thereof. These runners are turned upwardly at their forward ends and connected by the pins 13 or the like to the head bar 12. These pins are preferably secured to one of the parts and project through a slot 14 in the other part.

Fixed on the runners are the standards 15 and 16, to the former of which is secured the cross bar 17 and to the latter the cross bar 18.

Upon each side of the sled, above the runners are the side bars 19, each of which is secured at its front end between the runner 10 and head bar 12 and joined near their rear ends by the cross bars 20 and 21. Side rails 22 and platform boards 23 are secured to these cross bars and to cross bar 18.

Connected with the cross bar 18 are the saddles 24, which are formed with wings 25 that project upwardly upon each side of the side rails 22 and wings 26, which form a journal for the shaft 27, upon which is fixed the crank arm 28 and crank arms 29.

Attached to the head bar 12 is the plate 30, and between which and the draw bar 31 is the link 32 having a slot 33 therein, into which projects a guide pin 34. The rear end of the draw bar 31 is pivotally connected with the crank arm 28 at the face portion 37 and is provided with a slot 35, into which projects a guide pin 36 fixed in the cross bar 17.

A bracket 38 is fixed to and near the rear end of each of the runners 10 and pivotally connected therewith is a brake bar 39 connected with the adjacent crank arm 29 by a link 40. The inwardly projecting portion of the base of each of the runners 10, opposite the brackets, is cut away at 41 to receive the brake bar 39. Thus the inner face of the latter does not project beyond the outer edge of the base of the runner, thereby minimizing the possibility of damage or injury to the brake bar 39 and interference with the smooth running of the sled.

Secured to the link 32 is a steering bar 42 of conventional form. In Figure 6 I have shown a modified form of this bar, which is therein designated 43 and is provided with inwardly projecting handles 44 at each end thereof. With this form of steering bar, the hands when grasping the handle 44 are protected by the guard portions 45 against injury if the steering bar should meet an obstruction.

Figure 2:
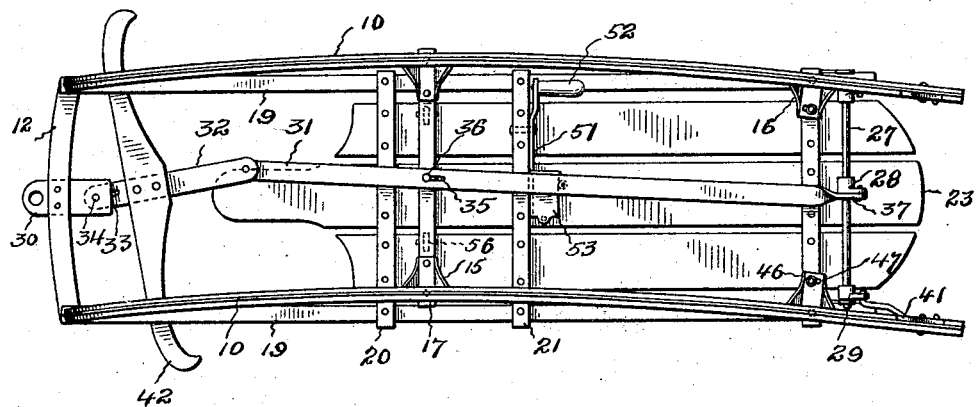
Figure 2 is a view of the underside thereof with the runners flexed in one direction.

As the rear end of the draw bar 31 is fixed against lateral movement, the swinging of the steering bar 42 causes the forward end thereof to move laterally about the center of the connection at the crank arm 28. Through the cross bar 17 this motion is transmitted to the runners so that in one of their extreme positions they occupy the planes substantially as shown in Figure 2. When flexed, the runners move about the axis of the pins 46, each of which connects the standard 16, cross bar 18, side rails 22 and saddle members 24 together as a unit. In the head of each of the standards 16 is a slot 47, through which projects the pin 48 fixed in the cross bar 18.

Between the standards 16 and cross bar 18, are the washers 49 upon the pins 46 and 48, having washers 50 adjacent to the heads thereof, substantially as shown in Figure 5.

Figure 3:
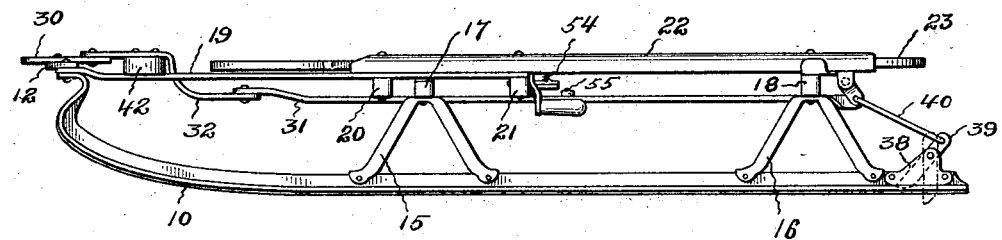
Figure 3 is a side elevation thereof.

Movement of the steering bar 42 forward causes the draw bar 31 also to move forward, and through its connection with the crank arm 28 rock the shaft 27, and through the links 40 move the brake bars 39 to their brake position, illustrated by broken lines in Figure 3, at which time the nose thereof projects below the runner and into the surface over which the sled is traveling.

I have provided means whereby this bar 31 may be held against forward movement if desired, comprising a rock lever 51 pivoted to the cross bar 21, having a handle 52 at one end under one of the side rails 22 and a plate 53 at the other end, which is held normally in its up position by a spring 54. On the draw bar 31 adjacent to the plate 53 is a stop member 55. When the handle 52 is pulled upwardly the plate 53 is moved downwardly and in front of the stop member 55, thus preventing forward movement of the draw bar.

The strip 11 upon the runners adds strength to the runners without affecting its lateral flexibility and also provides a contact surface of relatively narrow width.

The flexibility of the parts is facilitated when there is a weight upon the platform by an antifriction mechanism, which comprises a pair of rolls 56 journaled upon studs 57 within recesses 58 in the cross bar 17. These rolls are journaled so that a portion thereof projects above the top of the cross bar 17 (see Figure 4) and contact with the rail 59, attached to the platform boards 23 and carry the platform and the weight thereon. This insures an easy and practically frictionless lateral movement of the runners.

Within the scope of the appended claims minor changes and alterations may be made within my invention, and I would therefore have it understood that I do not limit myself to the exact construction herein shown and described.

Having described my invention, what I claim as new and desire to secure by Letters Patent, is:—

1. In a sled; a body having a platform as part thereof; flexible runners associated with the body; standards arranged in pairs and associated with the runners to support the platform, one of such pairs of standards being adjacent to the longitudinal center of the runners; a cross bar connected with the last mentioned pair of standards; and antifriction rollers between the cross bar and platform to facilitate the lateral movement of the cross bar.

2. In a sled; a body member; a rock shaft supported relatively thereto; runners connected with the body member; a draw bar connected with each of the runners near the rear ends thereof; a steering bar; a connection between the steering bar and rock shaft whereby a straight line movement of the steering bar will actuate the rock shaft; and means associated with the body member to prevent such straight line movement when desired, comprising a rock lever movable into and out of the path of a projection on the draw bar.

3. A sled having a platform, cross bars connected therewith, companion runners movably connected to rigid parts at their front ends, and pivotally connected to one of said cross bars adjacent to the opposite end, a cross bar movable relatively to the platform, having a fixed connection with the runners between its ends; and means for moving the last mentioned cross bar laterally and thereby flexing the runner between its ends in substantially parallel lines, comprising a rock lever fixed near one end and having an operative connection with the last mentioned cross bar, and a manually actuated rock member connected therewith whereby movement of the latter will be transmitted to the rock lever and through the cross bar to the runners which will thereby be flexed in substantially parallel and curved lines between the ends thereof.

In testimony whereof, I have hereunto affixed my signature.

ROSS M. G. PHILLIPS.